United States Patent
Ishikawa et al.

(10) Patent No.: US 6,511,191 B1
(45) Date of Patent: Jan. 28, 2003

(54) OPTICAL SWITCH SYSTEM AND METHOD FOR ALIGNING OPTICAL AXIS THEREIN

(75) Inventors: Tadaaki Ishikawa, Tsuchiura (JP); Masaya Horino, Yasato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/921,779

(22) Filed: Aug. 6, 2001

(51) Int. Cl.[7] ................................. G02B 5/08
(52) U.S. Cl. ................. 359/857; 359/858; 359/850; 359/298; 359/299
(58) Field of Search ................. 359/857, 858, 359/850, 298, 299, 222; 385/16, 22, 23, 36, 17, 18, 19, 20, 21

(56) References Cited

U.S. PATENT DOCUMENTS 5,875,271 A  2/1999  Laughlin
6,101,299 A  8/2000  Laor

FOREIGN PATENT DOCUMENTS

WO   WO 01/24384 A2   9/2000

*Primary Examiner*—Mohammad Sikder
(74) *Attorney, Agent, or Firm*—Antonelli, Terry, Stout & Kraus, LLP

(57) ABSTRACT

In an optical switch system for switching over plural input lights and plural output lights corresponding thereto through spatial optical connection therebetween, having: a first reflection mirror to be directed with an input light and being controllable in position thereof; a second reflection mirror disposed opposite to the first reflection mirror, for reflecting the light reflected on the first reflection mirror, so as to outputted it therefrom; means for controlling positions of the first and second reflection mirrors, respectively; and means for adjusting the position of the first and second mirrors, which are controller by the controlling means, wherein a reference light being substantially different from the input light in wavelength is generated; both the reference light and the input light reflect upon the first and second reflection mirrors; and (c) optical intensity of the reference light selectively diverged from the reflection light is detected, thereby controlling positions of the first and said second reflection mirrors, so as to obtain the maximum in optical intensity of the input light.

11 Claims, 9 Drawing Sheets

WAVELENGTH-TRANSMITTIVITY CURVE

OPTICAL SWITCH SYSTEM AND METHOD FOR ALIGNING OPTICAL AXIS THEREIN

BACKGROUND OF THE INVENTION

The present invention relates to an optical switch system for switching optic signal to be used as an exchanger or switch in an optical communication, and in particular, to an optical switch system for enabling multi-channeling through spatial switching by means of a three-dimensional (3-D) beam steering with using the 2-D matrix and a method for aligning optical axis in such the switch system.

Conventionally, accompanying with development of an optical communication system with using an optic fiber, an optical switch is adopted as a switch or exchanger of such the system. In particular, with the demand for high-speed and large capacity of the communication system, in recent years, the optical switch of multi-channels, so-called an optical switch of matrix-type is applied therein.

The optical switch of so-called a matrix-type is disclosed as an example of a two dimensional (2-D) type, for example, in Japanese Patent Laying-Open No. 2000-330044, wherein connection of optic signals is exchanged or switched over on a plane. However, though this 2-D type optical switch of the conventional art is simple in the structure thereof, it has a limit in multiplexing of channels because of the structure of aligning the optic fibers on the plane, therefore in recent years, there is a strong demand for an optical switch with using the spatial optical connection therein, i.e., an optical switch of 3-D type, which can be manufactured in compact and/or in small-sized.

In such the optical switch of such the spatial connection type, being called by the 3-D, as is shown in Japanese Patent Laying-open No. 2000-247065, for example, a collimated light beam is reflected upon a mirror, so as to switched over the optical connection, in the structure thereof. For this reason, an accurate control in position (or angle) of this reflection mirror is important. However, only with the control in the position of the mirror upon the basis of detected data from an angle sensor attached thereto, it is impossible to fully absorb or dissolve an influence due to thermal deformation of a housing, positional shifting due to secular deterioration or aged change, and further an error of the angle sensor, etc., therefore an efficiency is lowered in connection of optic signals.

Therefore, according to the conventional art, in general, after rough controlling on position of the mirror through an angle control with using such the angle sensor, a portion of the light beam for communication data, which passes through the optical switch, is divided, i.e., from several to several tens % thereof, to be received on a photo diode (hereinafter, by "PD") for estimating an intensity of optical data, through a branch provided on an output side of the system for separation of the optic signal, and the mirror is finely adjusted on the position thereof, so that the light appears the maximum intensity on the light received by the PD for data light intensity estimating.

However, in the optical switch according to the conventional art mentioned above, the difference in the optical intensity between an input light and an output light comes to be the optical loss within said the system. In general, there is provided criteria on the optical intensity of the communication light within the system. If the optical loss is large in the communication path, including the optical switch therein, the optic signal passing through such the optical switch cannot be transmitted, as it is, in the form of an output, in such the case, there is necessity of further operation, such as, amplification for the optical intensity thereof with using an optical amplifier, etc. This brings the optical switch system to be complex in the structure and to be large in sizes thereof. For this reason, it is necessary to reduce the optical loss therein, to be as small as possible.

By the way, as sources of the optical loss in the optical switch of such the spatial connection type, utilizing the mirror therein, there exist various losses, such as, a connection loss in an optic fiber to the optical switch, a loss due to transparency or transmittivity of a collimator lens for collimating the input light, a reflection loss upon the reflection mirror, a loss when re-forming image by the collimated light in an output side, and so on. For this reason, if there is further provided the optical branch for the position control of the reflection mirror mentioned above, since the communication light is consumed, in a part thereof, from a several to several tens percent (%), it constitutes a very large one, of the optical loss in such the optical switch.

Also, in the conventional art, for assuming that the optical connection is in an optimal condition, i.e., the optical intensity is at the maximum, it is necessary to search or find out the mirror position that comes up to the maximum in the optical intensity, while swinging the reflection mirror slightly in a certain degree, so as to change the optic path thereby. However, with this method, the optical intensity is also changed on the communication light during the search operation of the optimal position, therefore there is also a problem, in practical viewpoint.

SUMMARY OF THE INVENTION

Accordingly, an object according to the present invention is, for dissolving such the problems of the conventional arts as mentioned above, thus, to provide an optical switch system, having no such the optical loss irrespective of searching of the reflection mirror, with superior optical connection efficiency, being suitable to be used as the switch or exchanger in the optical communications, and further enabling multiplex channel corresponding to the current tendency of high speed and large capacity in the optical communications, and further being able to be compact and small-sized, and also to provide a method for aligning optical axis in such the switch system.

According to the present invention, for accomplishing the above-mentioned object, firstly, there is provided an optical switch system, for switching over plural input lights and plural output lights corresponding thereto through spatial optical connection therebetween, comprising: a first reflection mirror to be directed with an input light and being controllable in position thereof; a second reflection mirror disposed opposite to said first reflection mirror, for reflecting the light reflected on said first reflection mirror, so as to outputted it therefrom; means for controlling positions of said first reflection mirror and said second reflection mirror, respectively; and means for adjusting the position of at least one of said first and second mirrors, which are controller by said controlling means by means of a reference light being substantially different from said input light in wavelength thereof.

Also, according to the present invention, in the optical switch system as mentioned in the above, wherein said position adjusting means adjusts the position of at least the one of said first and second mirrors, so that the input light, reflecting upon said first reflection mirror and propagating onto said second reflection mirror, comes to the maximum in the optical intensity thereof.

Also, according to the present invention, in the optical switch system as mentioned in the above, wherein said position adjusting means adjusts the position of at least the one of said first and second mirrors by means of difference in intensity between the reference light irradiated upon said first reflection mirror and the reference light propagating onto said second reflection mirror.

And, according to the present invention, in the optical switch system as mentioned in the above, wherein in an input side, there are further provided a reference light generator means for generating the reference light therefrom and an optical mixer for mixing the said input light and said reference light to be irradiated upon said first reflection mirror, and in an output side are provided an optic divider for selectively reflecting said reference light thereupon so as to separate it form said input light, and a light receiving means for detecting the intensity of said reference light selected.

Further, according to the present invention, in the optical switch system as mentioned in the above, wherein in an input side, there are further provided a reference light generator means for generating the reference light therefrom, an optic mixer for mixing the said input light and said reference light to be irradiated upon said first reflection mirror and means for collimating said input light while dispersing said reference light selectively, so as to be irradiated upon said first reflection mirror, and in an output side is provided means for selectively detecting irradiating position of said dispersed reference light upon said second reflection mirror, wherein said position adjusting means adjusts the position of said first reflection mirror.

In addition thereto, according to the present invention, in the optical switch system as mentioned in the above, wherein said means for detecting the irradiating position of said dispersed reference light upon said second reflection mirror comprises plural numbers of light receiving elements, being disposed neighboring with each other, around a central portion thereof where a penetrating opening is formed for passing through the input light.

Further in addition thereto, according to the present invention, in the optical switch system as mentioned in the above, wherein said plural numbers of light receiving elements are provided in number of four (4).

Also, according to the present invention, in the optical switch system as mentioned in the above, wherein on a light path after said second reflection mirror, there is further provided a light receiving element having plural numbers of elements, being disposed neighboring with each other, around a central portion thereof where a penetrating opening is formed for passing through the input light, wherein said adjusting means control the position of said second reflection mirror upon basis of an output of said light receiving element.

Also, according to the present invention, in the optical switch system as mentioned in the above, wherein in an input side, there are further provided a reference light generator means for generating the reference light therefrom and means for collimating said input light and superimposing said reference light from said reference light generating means thereon in coaxial manner, so as to be irradiated upon said first reflection mirror, and in an output side is provided light receiving element for selectively detecting said reference light from the light propagating through reflection upon said first and said second reflection mirrors, wherein said position adjusting means adjusts the position of at least one of said first and second reflection mirrors.

And, according to the present invention, in the optical switch system as mentioned in the above, wherein said light receiving element comprises plural numbers of light receiving elements, being disposed neighboring with each other, around a central portion thereof where a penetrating opening is formed for passing through the input light.

Further, according to the present invention, in the optical switch system as mentioned in the above, wherein said plural numbers of light receiving elements constructing said light receiving element are in number of four (4).

In addition thereto, according to the present invention, in the optical switch system as mentioned in the above, wherein there is further provided means for selectively removing said reference light from the light irradiating upon said light receiving element.

Also, according to the present invention, also for accomplishing the above mentioned object, there is further provided a method for aligning axis of an optic signal, in an optical switch system for switching over plural input lights and plural output lights corresponding thereto through spatial optical connection therebetween, having: a first reflection mirror to be directed with an input light and being controllable in position thereof; a second reflection mirror disposed opposite to said first reflection mirror, for reflecting the light reflected on said first reflection mirror, so as to outputted it therefrom; means for controlling positions of said first reflection mirror and said second reflection mirror, respectively; and means for adjusting the position of at least one of said first and second mirrors, which are controller by said controlling means comprising the following steps of: (a) generating a reference light being substantially different from said input light in wavelength thereof; (b) reflecting both said reference light generated and said input light upon at least one of said first and said second reflection mirrors; and (c) detecting optical intensity of said reference light selectively diverged from said reflection light, and controlling position of at least one of said first and said second reflection mirrors, so that said input light is at maximum in optical intensity thereof.

And, according to the present invention, in the method for aligning axis of an optic signal as mentioned in the above, wherein said steps (a) to (c) are conducted when switching-over operation of said optical switch system.

Further, according to the present invention, in the method for aligning axis of an optic signal as mentioned in the above, wherein in said step (b), said reference light is superimposed with said input light, in coaxially therearound, to be irradiated upon at least one of said first and said second reflection mirrors.

And, according to the present invention, in the method for aligning axis of an optic signal as mentioned in the above, wherein in said step (c), the position of at least of said first and said second reflection mirrors are so controlled that said reference light, being superimposed abound said input light, comes to at a center of at least one of said first and said second reflection mirrors.

BRIEF DESCRIPTION OF THE DRAWINGS

Those and other features, objects and advantages of the present invention will become more apparent from the following description when taken in conjunction with the accompanying drawings wherein:

FIG. 10 is irradiated upon the four(4)-divided light receiving element mentioned above.

DETAILED DESCRIPTION OF PREFERRED EMBODIMENTS

Hereinafter, explanation will be given on embodiments of the present invention, by referring to the attached drawings.

Figure 1:
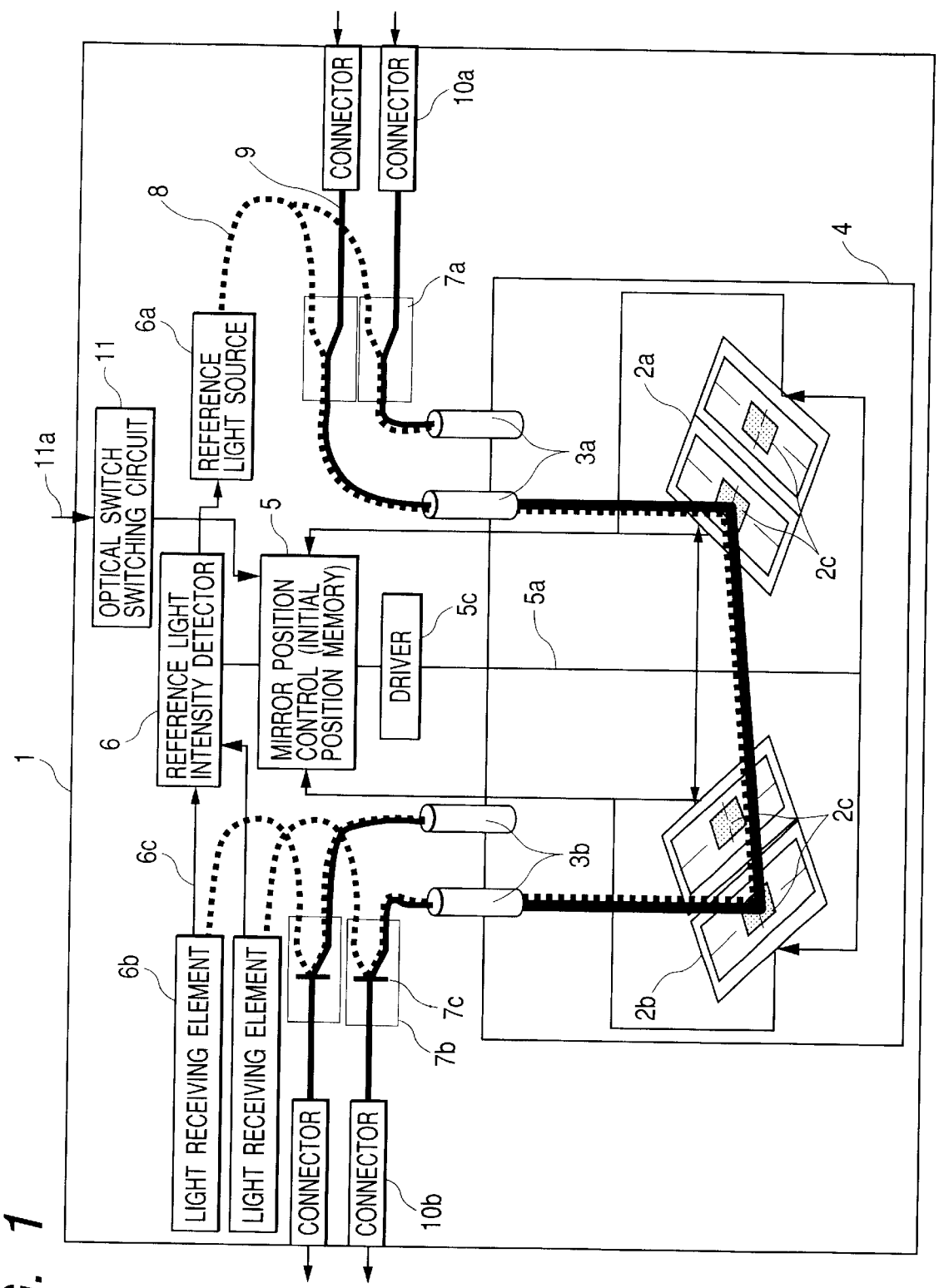
FIG. 1 is a view for showing the structure of an optical switch system, a 2×2 matrix switch, according to a first embodiment of the present invention.

First of all, FIG. 1 attached herewith shows the structure of a so-called 2×2 optic matrix switch, according to a first embodiment of the present invention. In this figure, a reference numeral 1 indicates an optical switch system, 2a a first reflection mirror, 2b a second reflection mirror, 2c a reflection mirror surface, 3a a collimator lens of input side, 3b a collimator lens of output side, 4 a housing of optic matrix switch, 5 a mirror position controller circuit, 5a a mirror driver signal, 5b a mirror angle signal, 5c a mirror driver circuit, 6 an optical intensity detector circuit for a reference light, 6a a light source for a reference optic beam, 6b a light receiving element, 6c an optical intensity signal, 7a a mixer, 7b a divider, 7c a reflection-type filter for reference light wavelength, 8 an optic path for reference light, 9 an optic path for communication light, 10a an input connector, 10b an output connector, 11 a switching circuit of optical switch, and 11a a switching signal for optical switch, respectively.

In the present embodiment, two (2) pieces of reflection mirrors 2a and 2b are provided, and on each of those mirrors 2a or 2b is provided an angle sensor (not shown in the figure) for measuring an angle of thereof. Further, data for positions or angles of those reflection mirrors 2a and 2b, corresponding to respective optic paths between inputs and outputs thereof, are stored or memorized in a mirror position controller circuit 5, in a form of initial values thereof, in advance. Also, in this figure, for easy looking and understanding thereof, one of the two (2) optic paths is removed from the figure, on the way from the input to the output.

Each broken line, in the figure, indicates an optic path 8 for the reference light, including one defined within the optical fiber, on the other hand, each thick and solid line indicates an optic path 9 for the communication light, also including one defined within the optical fiber therein. In ordinal, a light laying within a wavelength band from 1,200 nm to 1,600 nm is used as that communication light, but in more details thereof, practically, the light laying in a wavelength band of 1,310 nm or of 1,550 nm, in many cases. Further, for example, a semiconductor laser device is suitable as a light source thereof.

On the other hand, for the reference light, a light is used of wavelength band being different apparently and substantially from the communication light mentioned above, i.e., lower than 1,000 nm, not to appear on the communication light, namely for obtaining good separation between them. In particular, if using a visual light ray laser of wavelength being equal or less than 680 nm, since a semiconductor laser is applicable as the light source thereof which can be ordinarily available on the market, it is possible to obtain the light source with relatively cheap price for it, and further, this is particularly preferable, since a cheap semiconductor light receiving element (i.e., a photo diode, hereinafter by PD) of Si group can be applied as an optical detector used for detecting the laser light.

Also as the divider 7b, it is possible to apply a wavelength selective reflection filter, which is practically used, for example, in a video camera, and so on. Adoption of such the technology being available on the market enables the system to be realized with relatively cheap prices. Further, the collimator lenses 3a and 3b are provided for obtaining a parallel light or a light ray being nearly equal to that from the output light emitted from the optic fiber forming an optic path in the system, and in many cases, each of them is constructed with a combination of plural numbers of lenses, or a lens of varied refractive index type or a rod lens, etc.

The communication light passing through this collimator lens 3a in an input side directs toward a first reflection lens 2a, which is correspondingly located just below thereof. On the other hand, the light reflecting upon the second reflection light 2b is controlled to direct toward a collimator lens 3b in an output side, which is located correspondingly just above thereof, therefore the both light rays are in a relationship of being parallel with each other. With the reflection mirrors mentioned above, because the light used as the communication light lies in the wavelength band from 1,200 nm to 1,600, i.e., within so-called a region of infrared light, optimally it is a flat film made of material, in particular gold (Au), however in the place thereof, it may be formed with a film made of aluminum, since it is also possible to obtain high reflectivity for the communication light in that infrared region with the film made of material, i.e., aluminum, and this is advantageous economically.

Also for driving of the reflection mirrors 2a and 2b mentioned above, it is common to apply an attracting or absorbing power due to the dielectric force, a power due to the piezo effect, the electromagnetic power, and so on. In particular, the driving method of applying the dielectric force is advantageous, since only a small amount of current is sufficient for the driving, and/or that of applying the electromagnetic power has also an advantage that strong driving power can be generated thereby.

Figure 2:
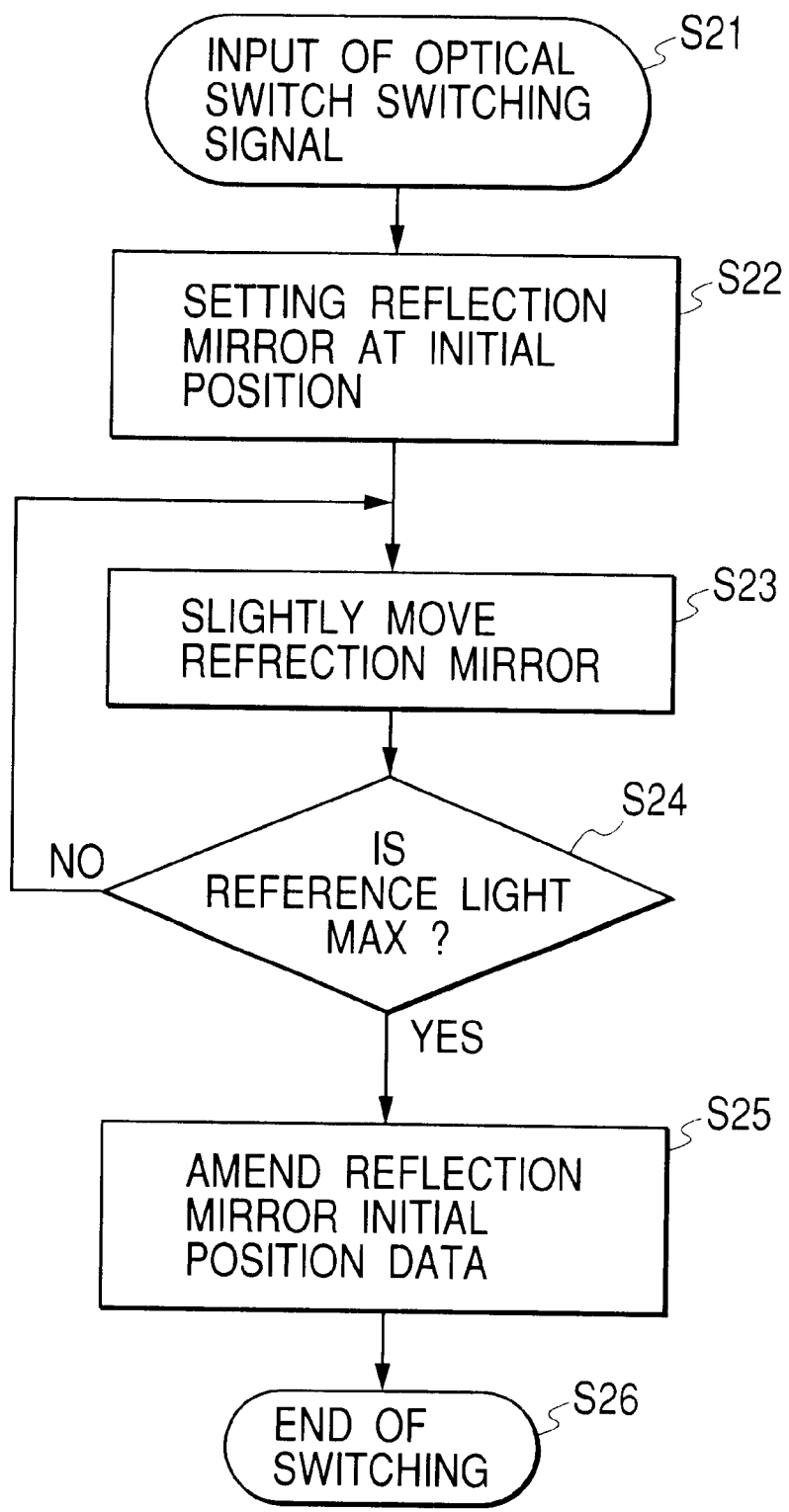
FIG. 2 shows a flowchart for showing a method for aligning an optical axis in the optical switch system shown in the FIG. 1 according to the present invention.

Next, explanation will be given by referring to FIG. 2 attached herewith, on the operations of the optical switch system, the structure of which was mentioned in the above. In particular, this FIG. 2 shows a flowchart of a method for aligning an optical axis in the optical switch system.

First of all, when the optical switch switching signal 11a is outputted, instructing to connect a certain input to a corresponding output, and it is inputted from an outside to the optical switch switching circuit 11 (step S 21), the mirror position controller circuit 5 issues or outputs an order or instruction to the driver 5c, for changing the position of the reflection mirrors while compensating them through data obtained from the angle sensors attached to the reflection mirror position which are predetermined and stored in advance therein, and with this, the driver 5c drives the reflection mirrors 2a and 2b into the initial position of them which are memorized in advance (step S22).

With such the mirror position control as mentioned above, for example, the communication light 9 inputted from an outside through the optic fiber is mixed (or superimposed) with the reference light 8 (see broken lines in the above FIG. 1) generated by the reference light source 6a in the mixer 7a. After being collimated by the collimator lens 3a, this mixed light reflects upon the first reflection mirror 2b to be directed toward the second reflection mirror 2b, and further reflects thereupon. Then, this light is guide into the optical fiber which is provided within the system as a wave-guide, through the collimator lens provided in an output side, again.

Thereafter, the mixed light led into the optical fiber is guided into an inside of the optic divider 7b, and only the reference light is divided and taken out from it through the function of the filter for reflecting the wavelength band of the reference light (i.e., reflection filter for reference light wavelength band) which is provided within an inside thereof, thereby to be guided into the light receiving element 6b through an optical fiber, too. On the other hand, the communication light passing through the above-mentioned optic divider 7b is outputted to an outside through the connector 10b provided in the outside.

Figure 3:
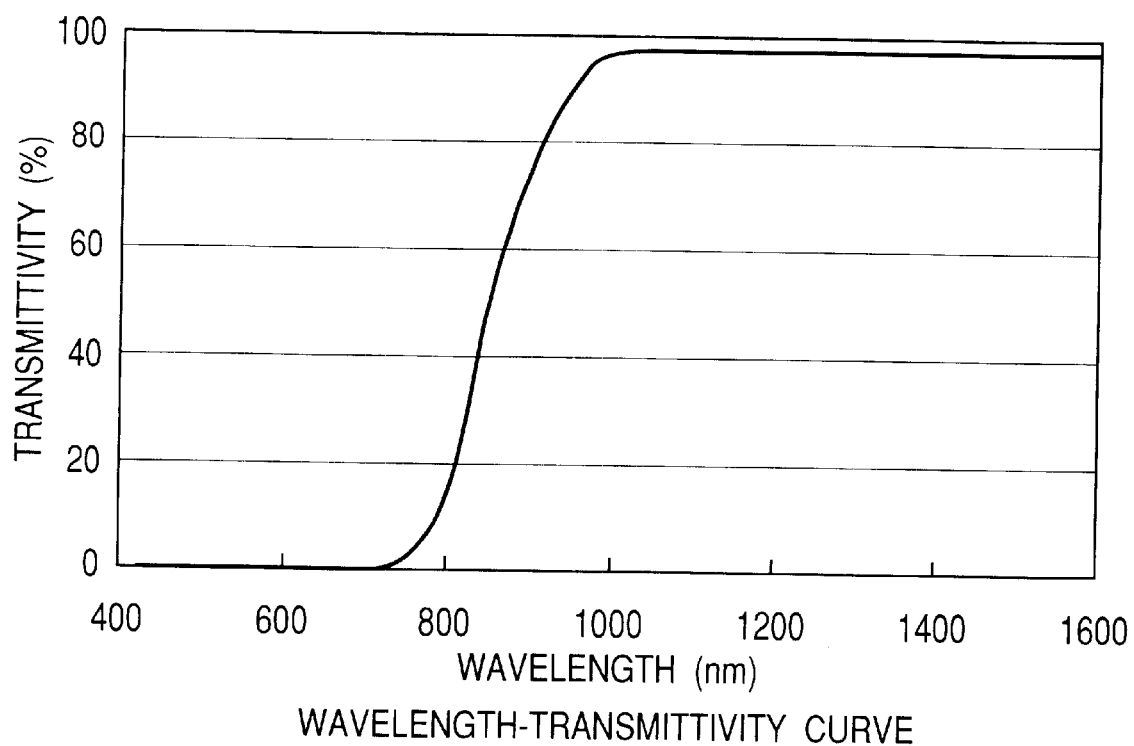
FIG. 3 shows a graph of the wavelength-transmittivity (permeability) curve of a reference light wavelength band reflection filter of an optic divider in the optical switch system shown in the FIG. 1.

Further, the reflection filter for reference light wavelength band in the above-mentioned optic divider 7b has such a wavelength-transmittivity (permeability) characteristic curve as shown in FIG. 3, for example. Namely, this reflection filter passes the communication light of the wavelength from 1,200 nm to 1,600 nm, through it, and it reflects the reference light of the visible light wavelength band lower than 680 nm, thereon, but not passing it therethrough, thereby enabling effective separation of the light of the wavelength.

Figure 4:
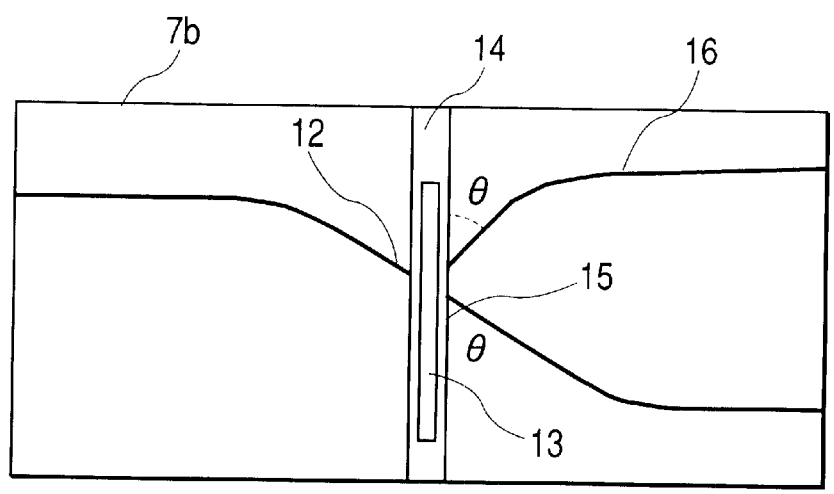
FIG. 4 shows an example of the structure of the optic divider, which uses the reflection filter having the characteristic curve shown in the FIG. 3 therein.

Also, as an example of the structure of this optic divider 7b, as shown in attached FIG. 4, a slit 14 is formed on the way of the straight line portion of the wave-guide 12 made from a quartz or Si substrate or made of organic resin, being inclined a little bit to this straight line, and a reflection filter 13 for the reference light wavelength band is inserted into an inside thereof. Furthermore, a wave-guide 16 is provided in the opposite direction, with inclination of an angle (θ) being same to the angle 15 (θ) of the wave-guide 12 with respect to this slit 14.

With the optic divider 7b of such the structure, the communication light advancing (or propagating) within the optic wave-guide 12 penetrates through the filter 13 mentioned above to be outputted, however the reference light is guided into the wave-guide 16 for the reference light through total reflection thereof upon the filter 13 mentioned above. Other than this, there are methods as the principle of the optic divider mentioned above, such as, a MZ type optic divider and utilizing of a prism, etc.

Next, the intensity signal of the reference light received upon the above-mentioned light receiving element 6b is compared and inspected within the reference light intensity detector circuit 6. Herein, because of a possibility that the initial values of the reflection mirrors memorized in advance into the mirror position controller circuit 5 may be shifted in the position or angle thereof due to temperature and/or secular changes, and influences of noises, etc., those initial positions (or angles) necessarily do not bring about the optimal optic connection.

Then, turning back to the FIG. 2 mentioned above again, the reflection mirror makes a slight movement (a tremor) thereof (step S23). Thereafter, a decision is made on whether the reference light received upon the light receiving element 6b shows the maximum value of optical intensity or not (step S24). If being decided to be at the maximum in optical intensity of the reference light ("yes") in the decision, the initial position of reflection mirror, which is stored in advance into the mirror position controller circuit 5, is corrected by using that position bringing about the maximum optical intensity of the reference light (step S 24), and then finishing the series of processes for the switching operation (step S 25). On the other hand, when not decided at the maximum ("no") in the optical intensity of the reference light, the process turns back to the step S23, again, and repeats the steps S23 and S24, continuingly until when the reference light shows the maximum value in the optical intensity thereof.

In this manner, according to the optical switch system and the method for aligning the optic axis therein of the present invention, the optical intensity is intestinally shifted, on the reference light that is received upon the light receiving element 6b, by making the reflection mirror stirring (the slight movement) in the angle thereof, thereby determining the angle of the reflection mirror for obtaining the maximum optical intensity within the reference light intensity detector circuit 6. And, once the angle (i.e., the position) of the reflection mirror for bringing about the maximum optical intensity is determined, the position is memorized as a new initial potion therein.

According to such the method for aligning the optical axis as was mentioned in the above, it is possible to start the position control of the reflection mirrors from the values being nearer to the position (i.e., the angle) of the reflection mirror bringing about the maximum optical intensity than before, i.e., the preset value stored in advance, in the switching operation for the next time in the optical switch system. Further, the present embodiment shown herein is that, in which the present invention is applied into the 2×2 optic matrix switch, however the present invention is also applicable, further into other optical switch system of a multi-channel optic matrix switch, provided that conditions are prepared for the maximum driving angle, degree of horizontality between the collimated light rays, and dispersion of the reflection mirror, etc. For example, in the case of applying it into the a 32×32 optic matrix switch, the following condition must be satisfied, on calculation, the distance between the neighboring reflection mirrors is about 2 mm, the distance between the first and second reflection mirrors about 100 mm, and the driving angle of the reflection mirrors about ±10°, and so on.

As apparent from the above, with the optical switch system according to the present invention, since the position (i.e., the angle) of the reflection mirrors can be always kept at the optimal position by means of the method for aligning the optic axis thereof mentioned above, although there is a possibility that it may be shifted or changed due to the secular changes and/or the change of temperature in actual circumferences where it is practically applied into, etc., even in optical connection path in the system being determined at the optimal value once (for example, the time of shipment of the product), therefore, it is possible to obtain the condition for the optimal connection, though it may change the optical intensity of the communication light but only a little bit, during the control operation thereof.

Figure 5:
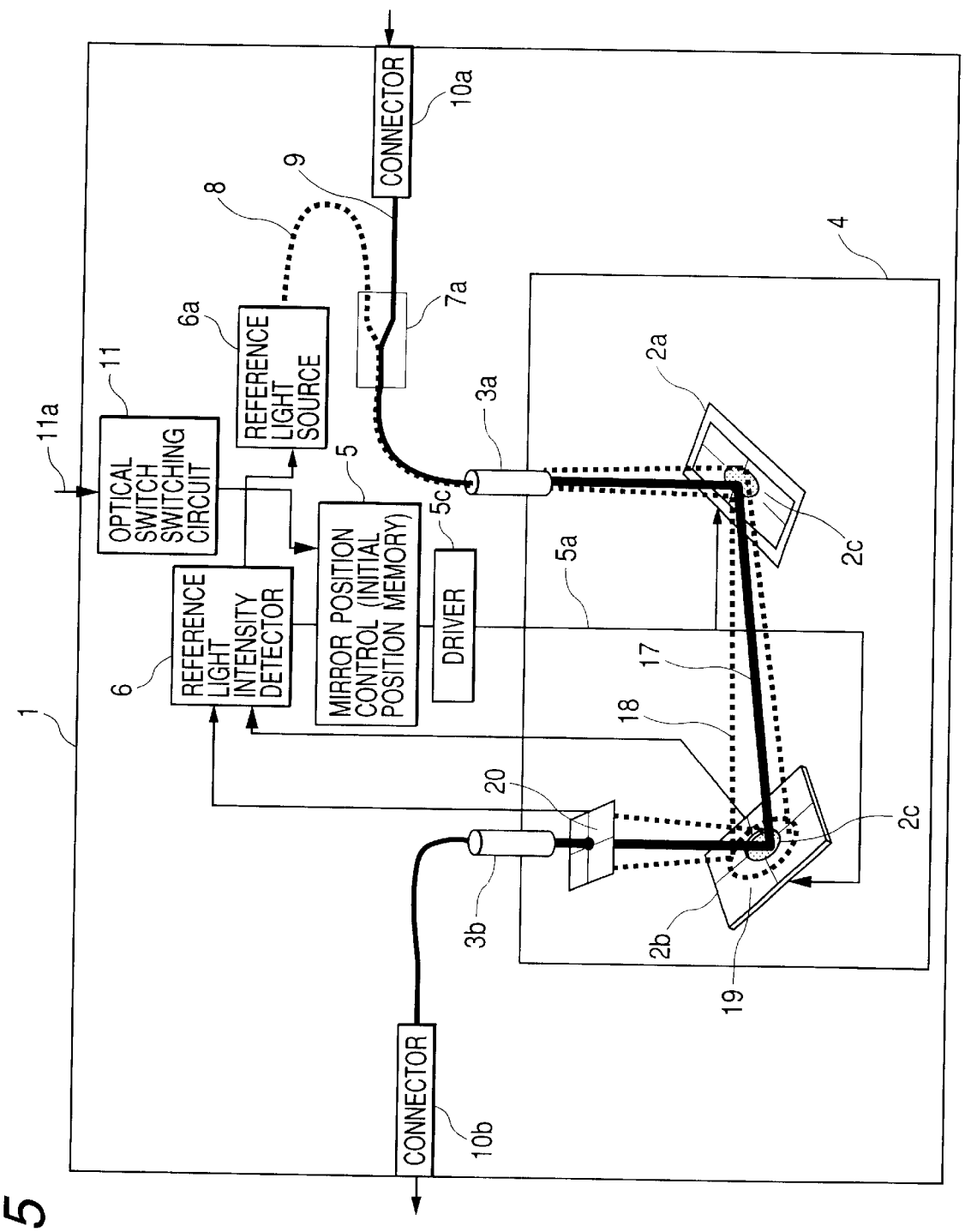
FIG. 5 is a view for showing the structure of another optical switch system, a matrix switch, according to a second embodiment of the present invention.

Next, FIG. 5 also shows the structure of the matrix-type optical switch system, according to a second embodiment of the present invention, briefly. In this figure, also one of the two (2) optic paths from the input to the output is removed from, for easy looking and understanding thereof.

In this second embodiment, the positional relationship between each the collimator lens and the reflection mirror is same to that mentioned in the above. However, in the present embodiment, intentionally, the material is selected to use for forming the collimator lenses 3a and 3b mentioned above, which brings about a large difference in the refractive index with respect to the wavelength, i.e., the material having large chromatic aberration. In the case where the collimator lens formed of such the material is so constructed that a collimated parallel light or that near to this can be obtained from the light beam at wavelength of the communication light, to be applied therein, then the reference light, i.e., the other light beam used in this system, is also collimated through the collimator lens, however as a result of the chromatic aberration thereof, it comes to be such a diffused light 18, as depicted by broken lines in the figure, around the center of the communication light (depicted by the thick solid line in the figure). Also, in the present embodiment, although both the first and second reflection mirrors 2a and 2b are not equipped with angle sensors therewith, however those may be equipped with, depending upon the necessity thereof.

With such the structure as was mentioned above, as apparent from the figure, though a reflection mirror surface 2c on the first reflection mirror 2a has an area being sufficient to cause the total reflection upon all the reference light 18 diffused in the collimator lens 3a thereon, on the other hand, a reflection mirror surface 2c on the second reflection mirror 2b has only an area thereof, though being sufficient to cause the total reflection upon all the communication light 17 which is not diffused in the above-mentioned collimator lens on it, but to cause the total reflection only in a part, in particular, of the diffused reference light 18.

Figure 6:
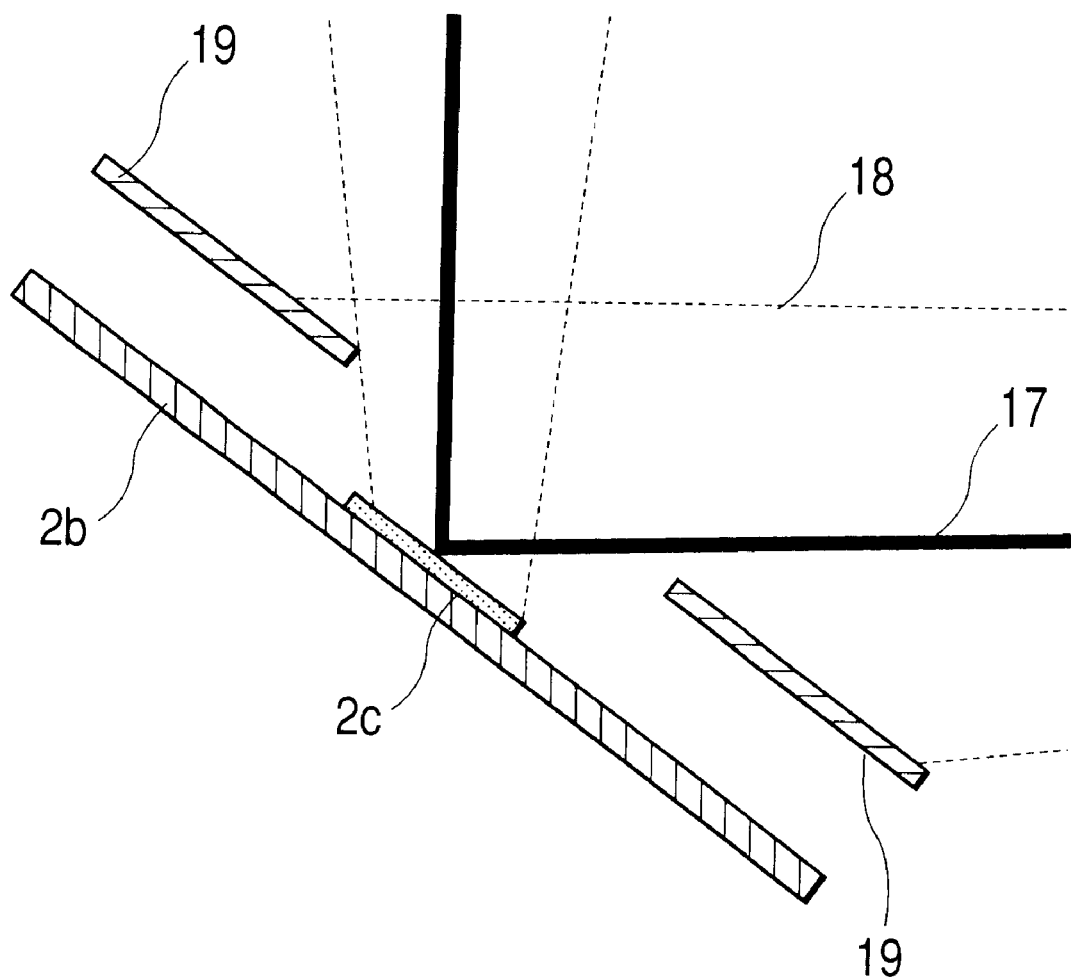
FIG. 6 is a cross-section view for showing a positional relationship between a four(4)-divided light receiving element with an opening and a second reflection mirror, in the optical switch system shown in the FIG. 5.

Also, in a front of the second reflection mirror 2b, as shown in attached FIG. 6, a four (4)-divided light receiving element 19 is provided in parallel with the second reflection mirror surface, which has an opening of a size for allowing the communication light 17 not diffused to passing through it. Therefore, a portion of the reference light 18 diffused in the collimator lens 3a is unable to pass through the opening formed in the four (4)-divided light receiving element 19, thereby being cut down. Then, comparing those of the reference light, which are received upon the respective portions of the four (4)-divided light receiving element 19, in the optic intensity thereof, enables determination of the position of the diffused reference light 18, and further assumption of the position of the communication light 17, as well, since the communication light 17 which is not diffused passes through at the central portion of the reference light 18. Then, using of the position of the assumable communication light 17 allows the position of the first reflection mirror 2a to be controlled, so that the communication light 17 is directed toward the reflection surface 2c of the second reflection mirror 2b, correctly. However, this four (4)-divided light receiving element 19 is disposed in such the position that does not obstruct the change of position of the reflection mirror 2b.

Figure 7:
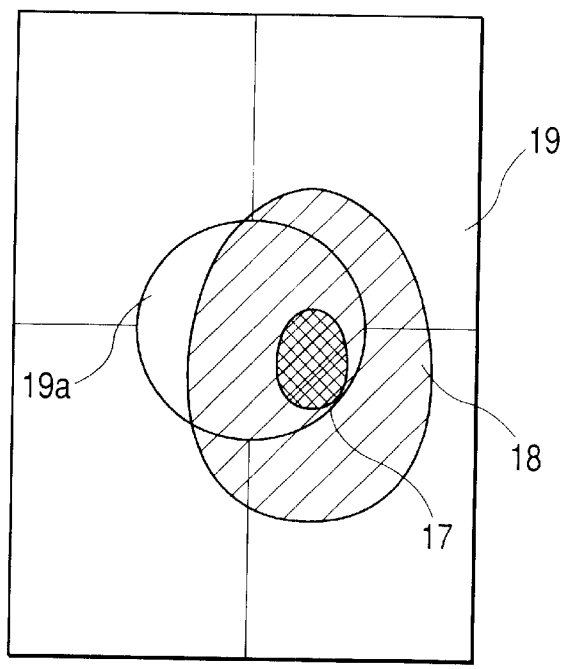
FIG. 7 is a view for showing a principle of the control on optical position in the optical switch system shown in the FIG. 5, in which is applied the four(4)-divided light receiving element shown in the FIG. 6.
Figure 8:
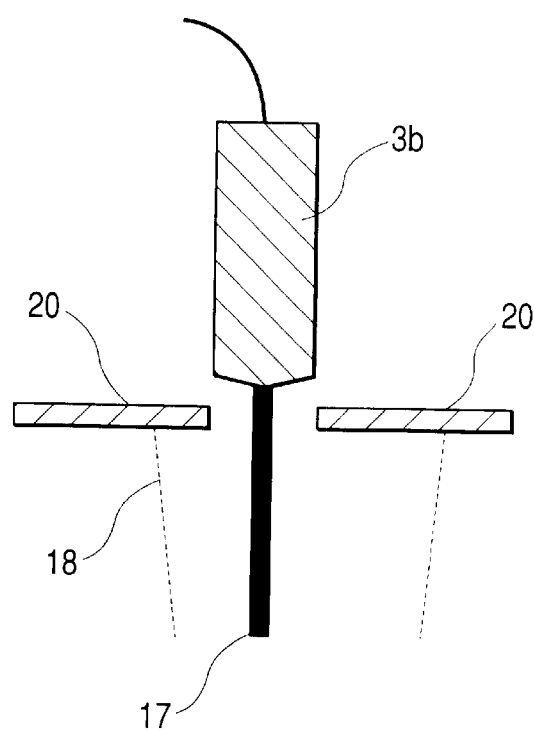
FIG. 8 is a cross-section view for showing a positional relationship between the four(4)-divided light receiving element and a collimator lens provided at an output side in the optical switch system shown in the FIG. 5.

This method will be explained in more details thereof, by referring to attached FIG. 7. First, assuming that the direction from the collimator lens 3a of input side toward the first reflection mirror 2a corresponding thereto is the vertical direction, then it is apparent that the axial direction perpendicular to the vertical direction within the mirror surface 2c of the first reflection mirror 2a and the axial direction perpendicular to the vertical direction within the mirror surface 2c of the second reflection mirror 2b are in parallel with each other, from the positional relationship of the reflection mirrors corresponding to the respective collimator lenses, for example, which was mentioned about relating to the embodiment shown in FIG. 1 of the above. Accordingly, the optical intensity of the received reference light 18 on the four (4)-divided light receiving element 19 disposed in the manner shown in this FIG. 7 should be symmetric on both sides, when the communication light 17 is directed to the center of the reflection mirror. However, as is shown in the above FIG. 7 exemplarily, when the diffused reference light 18 irradiates upon the four (4)-divided light receiving element 19, in particular, on the right-hand side much more, it is apparent that the position of the first reflection mirror 2a should be adjusted so that the collimated communication light 17 is shifted to the left-hand side on the figure.

Also, adjustment of the communication light 17 in a direction of up and down will be explained, hereinafter. As was shown in the FIG. 7 in the above, the optical intensity of the reference light 18 is not symmetric in the direction up and down upon the four (4)-divided light receiving elements 19, due to the difference in the distance from the first reflection mirror 2a. However, if obtaining the difference (i.e., value) of the optical intensity of the reference light 18 in advance, which was detected by elements in the direction of up and down on the four (4)-divided light receiving element 19 when the communication light 17 comes up to the center of the reference light 18, it is possible to adjust or compensate the angle in the up and down direction of the first reflection mirror 2a through an output from the four (4)-divided light receiving element 19, but without the provision of the angle sensor. This is also true in the case where the optical intensity is not equal on both sides (the right-hand side and the left-hand side), and application of the same method to the above-mentioned enables correct control on the position of the first reflection mirror in that case.

Thereafter, the collimated communication light 17 and a part of the reference light 18, reflecting upon the second reflection mirror 2a mentioned above, are directed toward the collimator lens 3b of output side corresponding thereto. According to the present embodiment, in a front of the collimator lens 3b of the output side (i.e., on the side of the second reflection mirror 2b ) is also provided or positioned a four (4)-divided light receiving element 20, in which is opened at the central portion thereof an opening of the diameter being at least necessary for passing the collimated communication light 17 therethrough. Namely, herein also, it is possible to obtain the position control of the second reflection mirror 2b, by the method similar to that of the position control of the first reflection mirror 2a by use of the four (4)-divided light receiving element 19.

As was mentioned in the above, the position control by use of the four (4)-divided light receiving element(s) 19 and/or 20, since the communication light can pass through those openings as it is, enables much more suppression of the optical loss therein, comparing to the embodiment shown in the FIG. 1 mentioned above. However, in general, the reference light 18 forming an image on the collimator lens 2b on output side is fully small in the size (i.e., diameter), but further provision of a filter, in front of the collimator lens 3b of the output side, for cutting off this reference light, enables prevention of the reference light from being superimposed or appearing as noises thereon, with certainty.

Also, the dived light receiving element(s) 19 and/or 20, as was mentioned previously, detects the reference light near to the visible one, and the light receiving element(s) can be constructed with a semiconductor light receiving element made of Si, being used widely in various kind of electronic apparatuses, therefore it is possible to construct or obtain such the light receiving element(s) with good quality and cheaply. In the embodiment mentioned above, the explanation was given about only the example of using the divided light receiving element(s) 19 and/or 20, such as, into the four (4)-divided light receiving element with opening, in more concrete or detail, however, principally, a three (3)-divided light receiving element with opening can also be applied as that light receiving element, for example, in the place of the four(4)-divided light receiving element. However, in this case, when obtaining the shift direction of mirror position, other calculations will be necessary, other than a simple calculation for comparison, in addition thereto. For such the necessity of the further calculation, obstruction, such as delay in the operation and/or complexity of the circuit, can be prospected, therefore, from this reason, it is preferable to utilize the four(4)-divided light receiving element.

Figure 9:
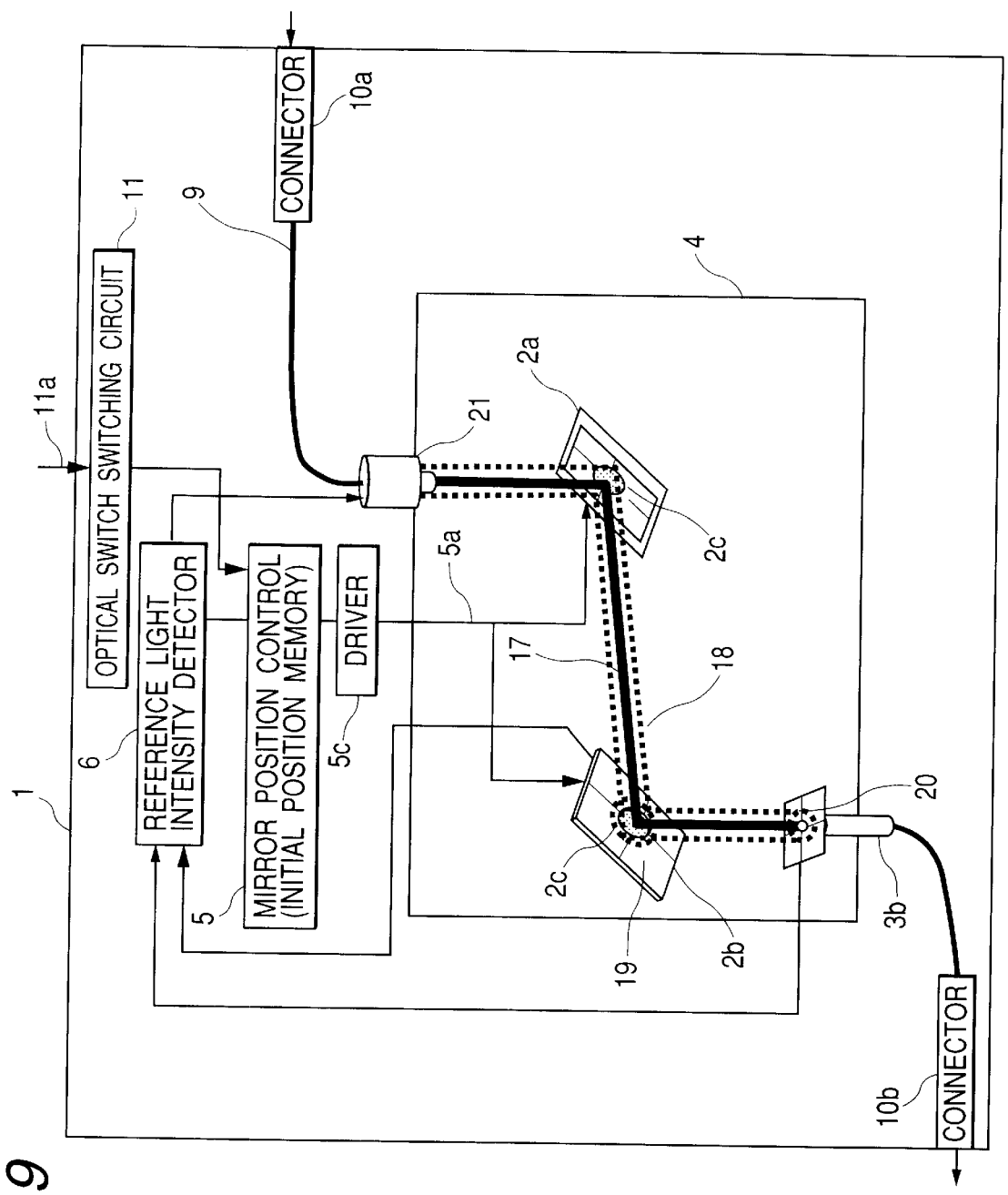
FIG. 9 is a view for showing the structure of other optical switch system, i.e., also a matrix switch, according to a third embodiment of the present invention.

Furthermore, FIG. 9 also shows the structure of the matrix-type optical switch system, according to a third embodiment of the present invention, briefly. In this figure, in the same manner as in the embodiment shown in the FIG. 5, only one of the two (2) optic paths from the input to the output is shown in the figure, but others are removed therefrom, for easy looking and understanding thereof.

In the matrix-type optical switch system of this third embodiment, as apparent from the figure, a collimated communication light/coaxial reference light forming device 21 is adopted or provided for mixing or combining the collimated communication light and the reference light on the same axis, in the place of the above-mentioned optic mixer 7a and the collimator lens 3a, under the optimal condition of the optical path. The vertical line drawn from this forming device 21 down to the first reflection mirror 2a is also parallel to the vertical line drawn from the collimator lens 3b for the output down to the second reflection mirror 2b, however in this embodiment, the direction is opposite (in down direction) to that of the embodiments mentioned above. With such the structure, the plane including the mirror surface 2a of the first reflection mirror 2a and the plane including the mirror surface of the second reflection mirror 2b are in the cento- or point symmetry around the central point on the optical path between those reflection mirrors 2a and 2b.

Figure 11:
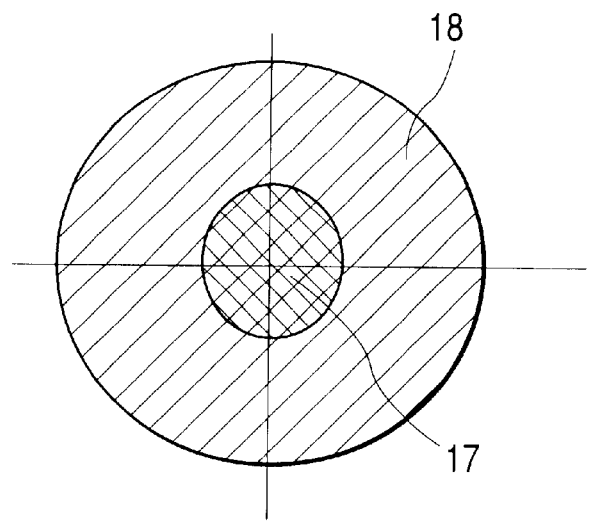
FIG. 11 is a view for showing an example of a pattern in projection of the light, which is produced by the collimated communication light-coaxial reference light-forming device shown in the FIG. 10 mentioned above.
Figure 12:
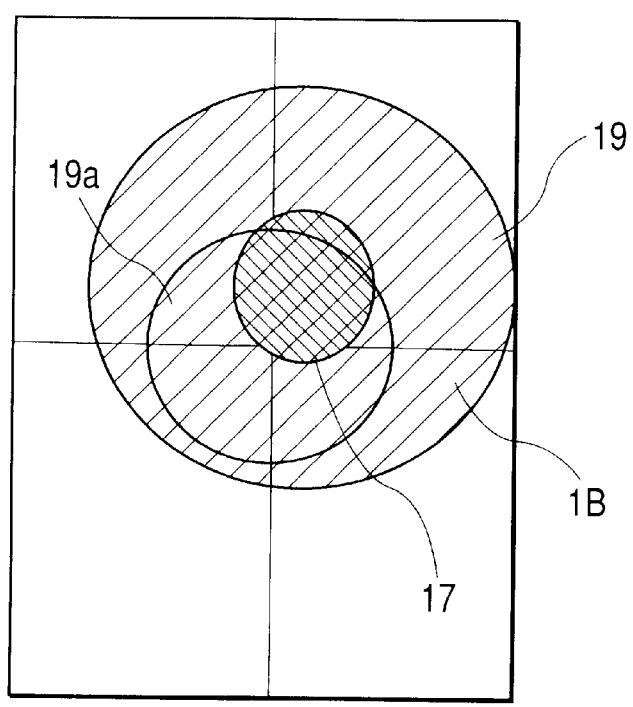
FIG. 12 is a view for showing an example of the condition, where the light from the collimated communication light-coaxial reference light-forming device shown in the above

Thus, according to this third embodiment, differing from the embodiment shown in the FIG. 5, both the light hitting or irradiating upon the reflection mirror in the vicinity of the center thereof and that in the vicinity of the periphery thereof have the same length or distance in the optical path from the collimated communication light/coaxial reference light forming device 21 to the collimator lens of output side. Accordingly, as shown in FIG. 11 attached, irradiation of the reference light 18, being collimated into the parallel light beam in the coaxial relationship with respect to the communication light 17 which is also collimated into the parallel light beam, brings about a circle pattern of the reference light, as shown in FIG. 12 attached, upon the upper surface of the four (4)-divided light receiving element 20, which is disposed in front of the collimator lens 3b of output side. Thus, the optical intensity on each light-receiving element comes to be equal to each other. Because of this, only controlling the mirror position, so that each element detects the equal optical intensity on the (4)-divided light receiving element 20, enables control of directing the collimated communication light 17 into the center of the opening. Thus, the adjustment by comparison of the distribution of intensity of the light received under the optimal condition is not necessitated, therefore being preferable. Also, the shape of the projection pattern of light thereupon should not be restricted only to such the circle one as mentioned above, however it is needless to say, for example, an oval shape is also able to bring about the same effect as was mentioned, which is in symmetry with respect to a line, in the directions up and down and both sides (the right-hand side and the left-hand side).

Also, as was mentioned in the above, in the structure of this third embodiment, since the plane including the mirror surface of the first reflection mirror 2a and the plane including the mirror surface of the second reflection mirror 2b are disposed in the positional relationship of the cento- or point symmetry relationship to each other, the positions of the both mirror surfaces are controlled, so as to be in the point symmetry relationship to each other, therefore the control can be simplified.

Figure 10:
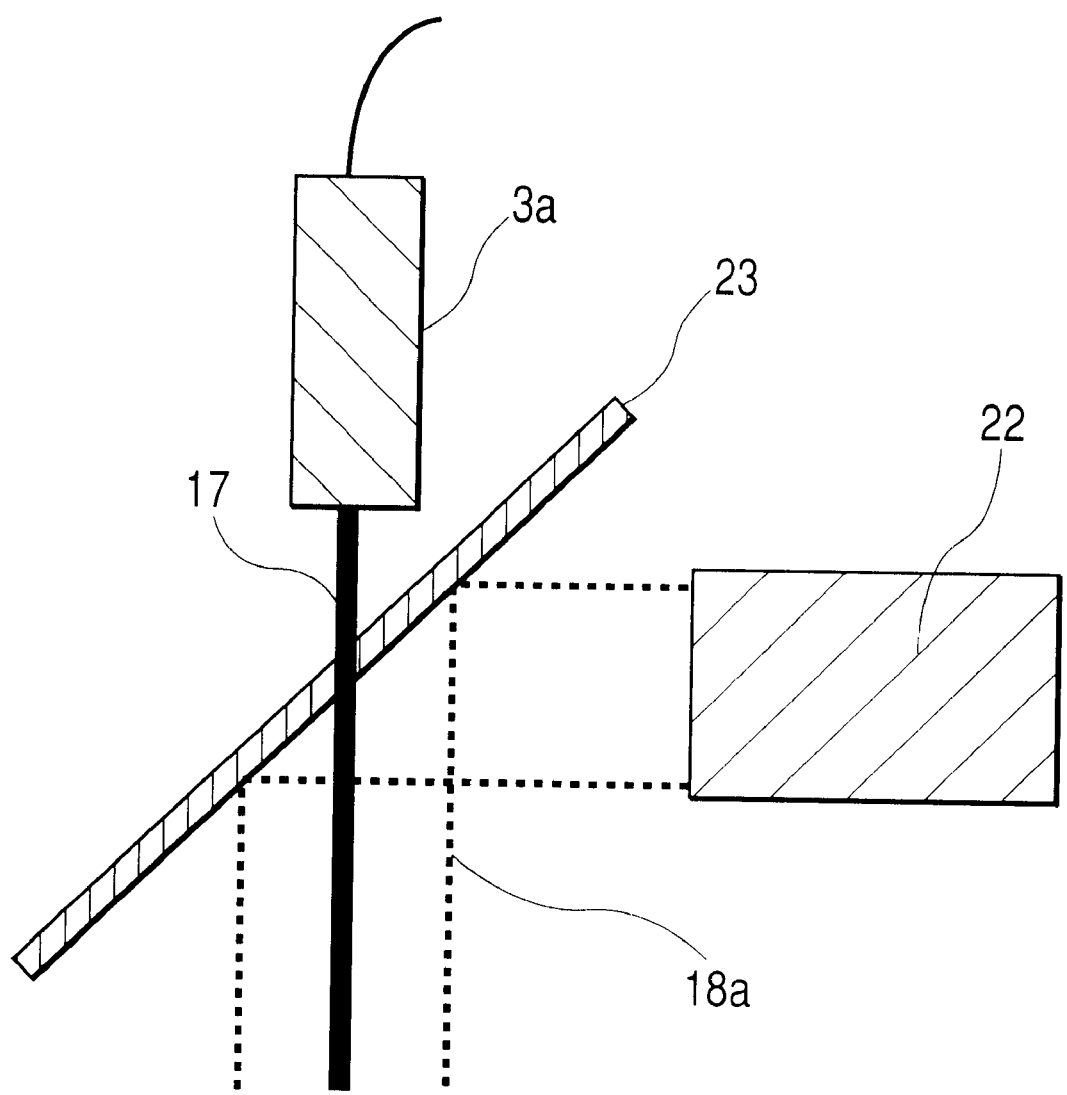
FIG. 10 is a cross-section view of a collimated communication light-coaxial reference light-forming device, which is used,in the third embodiment mentioned above.

Further, the collimated communication light 17 and the reference light 18 coaxial therewith, which are formed in the collimated communication light/coaxial reference light forming device 21, are shown in FIG. 10 attached. As is shown in the figure, on the way of the communication light 17 collimated into the parallel light beam through the collimator lens 3a of input side, a wavelength-selective permeation/reflection filter 23 is positioned inclining with an angle 45° thereto. On the other hand, the reference light 18a is irradiated, which is generated by a collimated reference light generator 22 and collimated into a parallel light beam to be larger in the beam diameter and the cross-section area than the above-mentioned communication light 17, so that the center thereof comes up to a point where the communication light can pass through the wavelength-selective permeation/reflection filter 23. Also, as the wavelength-selective permeation/reflection filter 23 is selected to one that can penetrate the light beam of wavelength (from 1,200 nm to 1,600 nm) of the communication light therethrough, but reflects that of wavelength (equal or lower than 1,000 nm) of the reference light thereupon. In more details, that having the same wavelength characteristics to those of the reflection-type filter 7c for the reference light wavelength shown in the FIG. 1 may be suitable for it.

In this manner, in the optical switch system according to the present invention, the reference light is utilized as that for accurate determination of the reflection mirror(s), which is different in the wavelength from the communication light. Due to the difference in the wavelength band, both the reference light and the communication light are free from being mixed up with each other. In this manner, with the system, in which only the reference light for the purpose of axial aligning is detected, after passing through the same optical path of the communication light, it is possible to reduce the loss of the communication light. Further, in general, an optical coupler or mixer is needed to couple or superimpose the reference light and the communication light with each other, however the loss of the communication light in this optical coupler is the penetration loss. Or, in the place of the optical branch, an optical divider is necessary, for example, however with the provision of such the filtering function of penetrating through or reflecting the specific wavelength, it is possible to suppress attenuation of the communication light, as well as to separate only the reference light therefrom. Since this reference light divided passes through the same optical path of the communication light, it is possible to adjust or control the position of the reflection mirror(s), so that the optical connection within the system comes to be the optimal, by checking the optical intensity of the reference light and controlling the position of the reflection mirror upon the basis of the optical intensity thereof.

Furthermore, daring to select the collimator lens of input side being large in the chromatic aberration thereof, while the aberration to the light beam of wavelength of the reference light to be largely different, comparing to that of the communication light, makes the reference light much more diffused around the center of the communication light. On the other hand, the light receiving element is provided on the second reflection mirror located in the output side, which is divided into at lease three (3) or more pieces (preferably, into four (4) pieces) around the opening gouged out at the position corresponding to the reflection mirror surface thereon. With this, both the reference light and the communication light reflecting upon the first reflection mirror are directed toward the second reflection mirror, however herein, only the collimated communication light passing through the above-mentioned opening reaches onto the second reflection mirror, while a portion of the diffused reference light is widen largely than the opening mentioned above, therefore it can be detected by the light receiving elements provided in three (3) or more in number around this opening. And, the direction of the first reflection mirror can be assumed upon basis of the fact that the optical intensity detected of which one of those light receiving elements is strong, thereby it is possible to control the position of the first mirror, so as to direct the communication light reflecting upon the first reflection mirror to the second reflection mirror correctly.

Also, in the input side of the collimator lens of output side, for use of image forming of the collimated light, namely on the side of the second reflection mirror, the other light receiving element is provided, which has an opening of size enough for passing the collimated communication light therethrough, and is divided into at lease three (3) or more pieces (preferably, into four (4) pieces) around the opening. With this, a portion of the communication light and the reference light can be detected by those light receiving elements, when the second reflection mirror is positioned appropriately, therefore it is possible to direct the communication light reflecting upon the second reflection mirror toward the collimator lens for use of image forming, correctly, by controlling the position of the reflection mirror upon the basis thereof. Namely, by use of the method mentioned above, it is possible to reduce the attenuation of the communication light in the optical switch much more, but without necessity of using the optical diver on an optical output side thereof.

In the embodiments mentioned in the above, only the examples are explained, in which the present invention is apply to the 2×2 matrix switch, however, the present invention should not be restricted only to those, but it can be applied to an optical matrix switch of N×N, for example.

As was fully explained in the above, according to the present invention is, there are provided an optical swathing system, having no such the optical loss irrespective of searching of the reflection mirror, with superior optical connection efficiency, being suitable to be used as the switch or exchanger in the optical communications, and further enabling multiplex channel corresponding current tendency of high speed and large capacity in the optical communication, and further being able to be compact and small-sized, and further a method for aligning optical axis in such the switch system.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. An optical switch system, for switching over plural input lights and plural output lights corresponding thereto through spatial optical connection therebetween, comprising:

a first reflection mirror to be directed with an input light and being controllable in position thereof;

a second reflection mirror disposed opposite to said first reflection mirror, for reflecting the light reflected on said first reflection mirror, so as to outputted it therefrom;

means for controlling positions of said first reflection mirror and said second reflection mirror, respectively; and means for adjusting the position of at least one of said first and second mirrors, which are controlled by said controlling means by means of a reference light being substantially different from said input light in wavelength thereof;

wherein said position adjusting means adjusts the position of at least the one of said first and second mirrors, so that the input light, reflecting upon said first reflection mirror and propagating onto said second reflection mirror, comes to the maximum in the optical intensity thereof.

2. An optical switch system, for switching over plural input lights and plural output lights corresponding thereto through spatial optical connection therebetween, comprising:

a first reflection mirror to be directed with an input light and being controllable in position thereof;

a second reflection mirror disposed opposite to said first reflection mirror, for reflecting the light reflected on said first reflection mirror, so as to outputted it therefrom;

means for controlling positions of said first reflection mirror and said second reflection mirror, respectively; and means for adjusting the position of at least one of said first and second mirrors, which are controlled by said controlling means by means of a reference light being substantially different from said input light in wavelength thereof;

wherein said position adjusting means adjusts the position of at least the one of said first and second mirrors by means of difference in intensity between the reference light irradiated upon said first reflection mirror and the reference light propagating onto said second reflection mirror.

3. An optical switch system, for switching over plural input lights and plural output lights corresponding thereto through spatial optical connection therebetween, comprising:

a first reflection mirror to be directed with an input light and being controllable in position thereof;

a second reflection mirror disposed opposite to said first reflection mirror, for reflecting the light reflected on said first reflection mirror, so as to outputted it therefrom;

means for controlling positions of said first reflection mirror and said second reflection mirror, respectively; and means for adjusting the position of at least one of said first and second mirrors, which are controlled by said controlling means by means of a reference light being substantially different from said input light in wavelength thereof;

wherein in an input side, there are further provided a reference light generator means for generating the reference light therefrom and an optic mixer for mixing the said input light and said reference light to be irradiated upon said first reflection mirror, and in an output side are provided an optic divider for selectively reflecting said reference light thereupon so as to separate it form said input light, and a light receiving means for detecting the intensity of said reference light selected.

4. An optical switch system, for switching over plural input lights and plural output lights corresponding thereto through spatial optical connection therebetween, comprising:

a first reflection mirror to be directed with an input light and being controllable in position thereof;

a second reflection mirror disposed opposite to said first reflection mirror, for reflecting the light reflected on said first reflection mirror, so as to outputted it therefrom;

means for controlling positions of said first reflection mirror and said second reflection mirror, respectively; and means for adjusting the position of at least one of said first and second mirrors, which are controlled by said controlling means by means of a reference light being substantially different from said input light in wavelength thereof;

wherein in an input side, there are further provided a reference light generator means for generating the reference light therefrom, an optic mixer for mixing the said input light and said reference light to be irradiated upon said first reflection mirror and means for collimating said input light while dispersing said reference light selectively, so as to be irradiated upon said first reflection mirror, and in an output side is provided means for selectively detecting irradiating position of said dispersed reference light upon said second reflection mirror, wherein said position adjusting means adjusts the position of said first reflection mirror.

5. An optical switch system, as defined in the claim 4, wherein said means for detecting the irradiating position of said dispersed reference light upon said second reflection mirror comprises plural numbers of light receiving elements, being disposed neighboring with each other, around a central portion thereof where a penetrating opening is formed for passing through the input light.

6. An optical switch system, as defined in the claim 5, wherein said plural numbers of light receiving elements are provided in number of four (4).

7. An optical switch system, as defined in the claim 4, wherein on a light path after said second reflection mirror, there is further provided a light receiving element having plural numbers of elements, being disposed neighboring with each other, around a central portion thereof where a penetrating opening is formed for passing through the input light, wherein said adjusting means control the position of said second reflection mirror upon basis of an output of said light receiving element.

8. An optical switch system, for switching over plural input lights and plural output lights corresponding thereto through spatial optical connection therebetween, comprising:

a first reflection mirror to be directed with an input light and being controllable in position thereof;

a second reflection mirror disposed opposite to said first reflection mirror, for reflecting the light reflected on said first reflection mirror, so as to outputted it therefrom;

means for controlling positions of said first reflection mirror and said second reflection mirror, respectively; and means for adjusting the position of at least one of said first and second mirrors, which are controlled by said controlling means by means of a reference light being substantially different from said input light in wavelength thereof;

wherein in an input side, there are further provided a reference light generator means for generating the reference light therefrom and means for collimating said input light and superimposing said reference light from said reference light generating means thereon in coaxial manner, so as to be irradiated upon said first reflection mirror, and in an output side is provided light receiving element for selectively detecting said reference light from the light propagating through reflection upon said first and said second reflection mirrors, wherein said position adjusting means adjusts the position of at least one of said first and said second reflection mirrors.

9. An optical switch system, as defined in the claim 8, wherein said light receiving element comprises plural numbers of light receiving elements, being disposed neighboring with each other, around a central portion thereof where a penetrating opening is formed for passing through the input light.

10. An optical switch system, as defined in the claim 9, wherein said plural numbers of light receiving elements constructing said light receiving element are in number of four (4).

11. An optical switch system, as defined in the claim 9, wherein there is further provided means for selectively removing said reference light from the light irradiating upon said light receiving element.

* * * * *